United States Patent [19]

Shireman et al.

[11] Patent Number: 4,942,843

[45] Date of Patent: Jul. 24, 1990

[54] AUTOMATED LEAD WIRE TINNING APPARATUS MECHANICAL ADJUSTMENTS AND IMPROVEMENTS

[75] Inventors: Mark J. Shireman, Minnetonka; Florence G. Benson, St. Michael, both of Minn.

[73] Assignee: Honeywell Inc., Minneapolis, Minn.

[21] Appl. No.: 253,295

[22] Filed: Oct. 5, 1988

[51] Int. Cl.$^5$ .......................... B05C 1/02; B05C 3/02; B05C 3/10
[52] U.S. Cl. ..................... 118/74; 118/423; 228/37; 427/294
[58] Field of Search ................ 228/33, 37; 118/74, 118/410, 411, 412, 428; 427/294

[56] References Cited

U.S. PATENT DOCUMENTS

| 3,680,762 | 8/1972 | Kondo | 228/37 |
| 4,139,143 | 2/1979 | Gumprecht | 228/37 |
| 4,158,076 | 6/1979 | Wallsten | 427/294 |
| 4,491,084 | 1/1985 | Marshall, Jr. | 118/683 |
| 4,573,430 | 3/1986 | Benson et al. | 118/74 |

Primary Examiner—S
Assistant Examiner—Willard Hoag
Attorney, Agent, or Firm—Donald A. Jacobson

[57] ABSTRACT

Apparatus for automatically tinning leads of components mounted on tapes to carry the components through solder wave stations have adjustments incorporated to permit tinning components of different sizes. Foam generators with independent foam rate adjustments are also provided to permit the adjusting foam height separately for each component lead. Guards are used with the foam generators to select specific segments of each lead for fluxing. A vacuum port with a vertical heated connection leading to a vertically oriented heated collector insures that excess solder will not clog the collection systrem. A shield between the vacuum port and the solder wave prevents solder being ingested by the port.

7 Claims, 7 Drawing Sheets

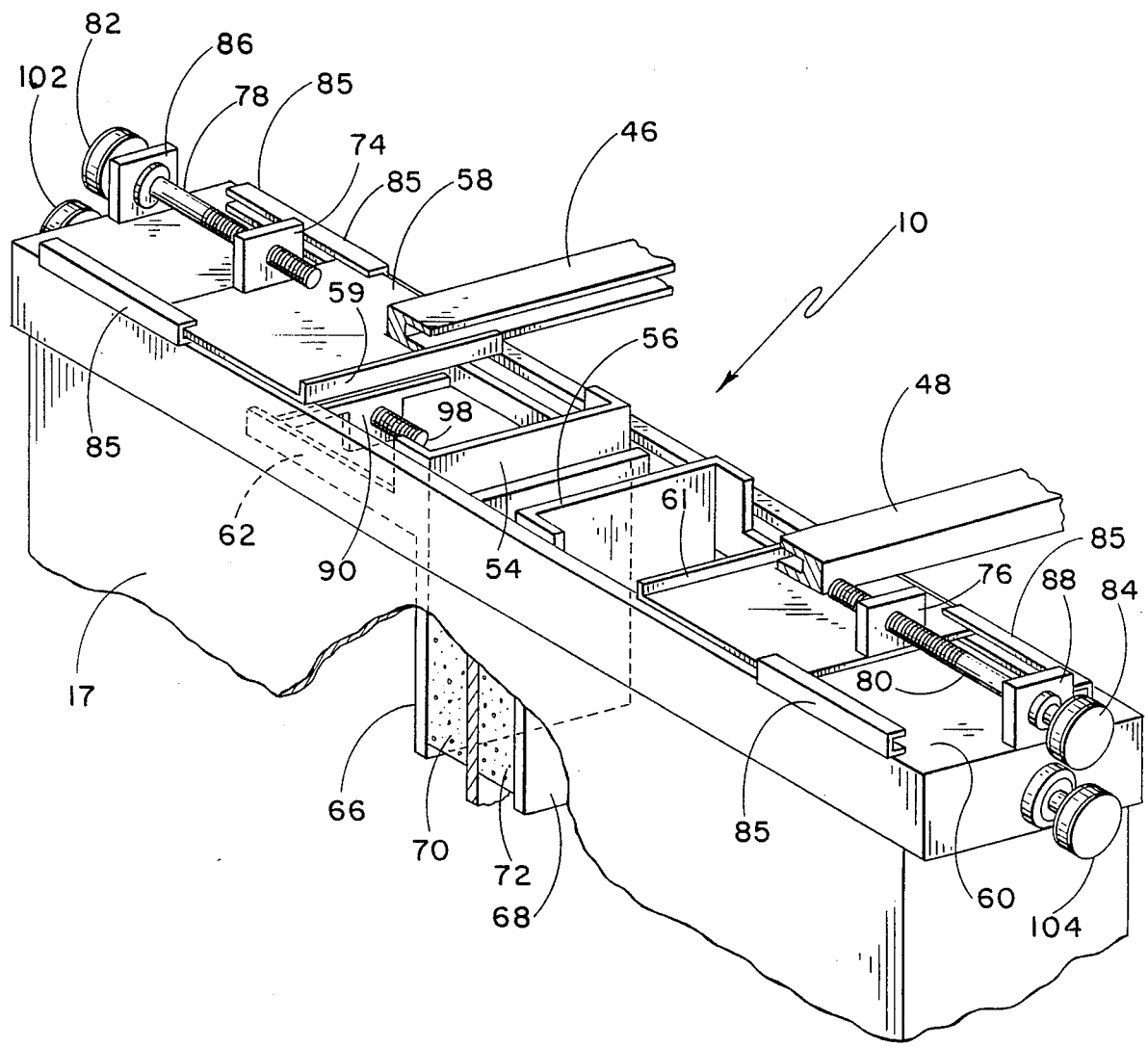

AUTOMATED LEAD WIRE TINNING APPARATUS MECHANICAL ADJUSTMENTS AND IMPROVEMENTS

FIELD OF THE INVENTION

This invention relates to the field of electrical manufacturing and particularly to means for tinning the conductors of components which may vary greatly in length, supplied in taping rolls in situ on the tape.

REFERENCE TO RELATED APPLICATIONS

This application is related to the following commonly-assigned applications filed concurrently herewith:

| Title | Ser. No. |
|---|---|
| Automated Lead Wire Tinning Apparatus Improvements | 07/253,294 |
| Automated Lead Wire Tinning Solder Wave Improvements | 07/253,297 |
| Automated Lead Wire Tinning Drive Roller Improvements | 07/253,296 |

BACKGROUND OF THE INVENTION

Previous inventions addressed the problems of automatically tinning components supplied mounted on long tapes and on spools or reels. In Marshall, Jr., U.S. Pat. No. 4,491,084 the use of apparatus which first removes components from the tape then tins the lead by moving the component in a vertical orientation through a series of stations and finally applying a new tape is taught.

In Benson et al, U.S. Pat. No. 4,573,430, which was also assigned to the instant assignee, apparatus was described which can tin components without the necessity of first removing them from their connecting tape. This previous patent did not address the problem of tinning components of different size or lead length. In addition, no provision was made to adjust the height individually of the foam applied to the two leads. This often resulted in flux being applied to either the component body proper or to the connecting tape which degrades the storage characteristics of the components. The vacuum on the port removing the solder "icicles" from the tinned wire is quite close to the tape and will occasionally pull the tape against the port. Since the port is at an elevated temperature when this occurs the tape will become charred and unusable. The vacuum line connecting the port to the collection jar is essentially horizontal which sometimes permits the molten solder to solidify in the line and block the vacuum line. The port can also collect solder directly from the solder chimney under certain conditions.

BRIEF SUMMARY OF THE INVENTION

The instant invention utilizes the basic structure of the aforementioned Benson et al patent to automatically tin the leads of tape-stored electrical components. Improvements have been incorporated into this basic structure to permit tinning the full range of sizes of tape stored components and to eliminate the other described problems of this device.

The full range of sizes of tape-stored components can vary in length by a factor of one and one-half to one. To accomodate this range of size variations a number of adjustments are required. The spacing between the rails which support the tapes must be made variable over the entire length of the machine. The portion of the lead which is exposed to the foam flux must be made variable both in length and location. When these changes are made the relationship between the vacuum port and the tape must also change.

Foam adjusting means are provided to adjust the height of the foam over each lead individually. Vertical and horizontal adjustments on the port relative to the tape are provided to insure that the tape is not drawn against the vacuum port. The vacuum ports and lines have been oriented vertically and the collector container heated to eliminate the solder solidification problem. A guard has been interposed between the solder wave chimneys and the vacuum ports to shield the vacuum flow to eliminate the problem of solder flowing from the solder chimney to the port.

BRIEF DESCRIPTION OF THE DRAWINGS

FIG. 2 is a perspective view of the top of a flux station.

DETAILED DESCRIPTION OF THE PREFERRED EMBODIMENT

Figure 2A:
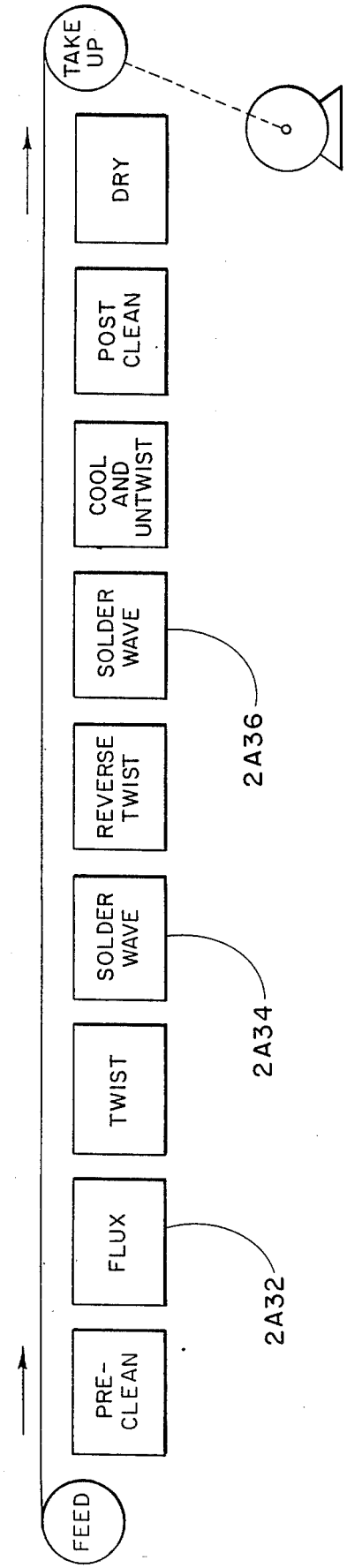
FIG. 2A is a block diagram of a lead wire tinning system according to Benson et al.

In FIG. 2A the sequence of operations as previously taught in the Benson et al patent is shown for the entire operations path using the same number references with a 2A prefix added. Flux station improvements are directed toward mechanical adjustments for stations at flux station 2A32. Our improved version is designated flux station 10. Rail adjustments are directed to all stages that utilize rails to support the tapes. Vacuum port adjustments and improvements are directed to solder wave stations 2A34 and 2A36.

Figure 1:
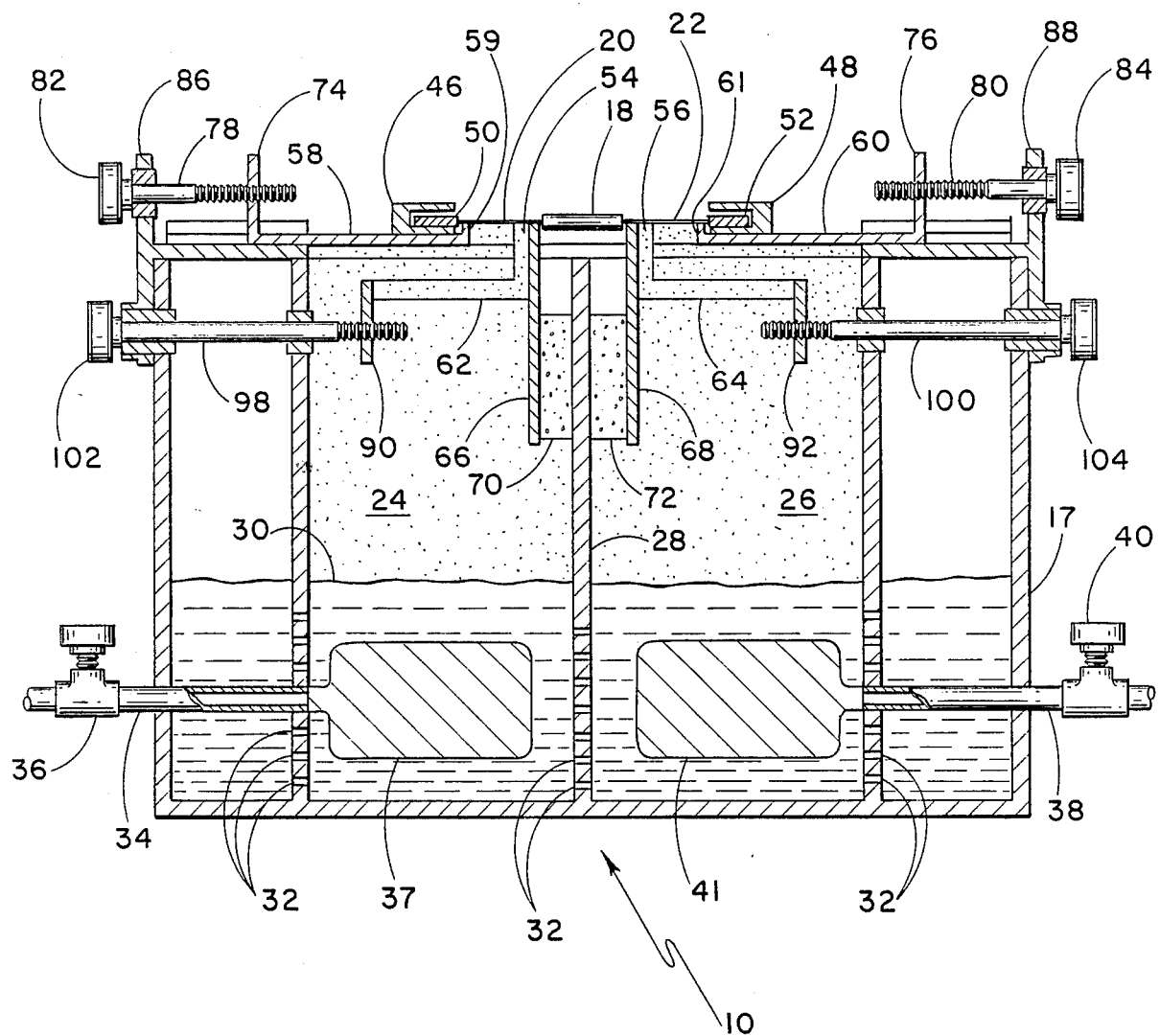
FIG. 1 is a cross-section view of a flux station.

In FIG. 1 a cross-section of flux station 10 is shown with necessary adjustments added to flux variable length components 18 and leads 20, 22. A container 17 holds two separate flux chimneys 24 and 26 separated by a partition 28. A liquid 30 which contains flux can communicate between chimneys 24, 26 and container 17 through holes 32 in partition 28 and the outer walls of the chimneys. An air line 34 with an adjusting valve 36 connects a source of compressed air, not shown, with a stone 37 in the interior of chimney 24 and likewise air line 38 with an adjusting valve 40 connects the same source of compressed air with a stone 41 in the interior of chimney 26. These stones are porous and are well known in the solder art to generate foam by allowing small bubbles to be formed. Valves 36 and 40 permit adjusting the height of the foam in respective chimneys 24 and 26 individually. While there is a free flow of fluid 30 in the bottom of container 17 into chimneys 24 and 26 there is no such flow of the foam between chimneys 24 and 26, consequently the rate of foam generation in each chimney is a function of the volumes of air flowing through the individual air lines 34 and 38 respectively.

Leads 20 and 22 move horizontally through foam extending from chimneys 24 and 26 and shear off the respective tops of these columns of foam which are continuously being generated by air flowing through respective lines 34 and 38. The result is that each successive pair of component leads 20 and 22 are coated with foam carrying flux. Since the height of the foam extending above chimneys 24 and 26 is controlled individually, the height of the two foam columns are adjusted to be equal and of the proper height, to ensure that each lead receives the same correct amount of flux.

Rails 46 and 48 surround and support tapes 50 and 52 which connects the series of leads 20 and 22 together and also pulls them through the foam extending upward from chimneys 24 and 26 respectively. A pair of inner guards 54 and 56 and a pair of outer guards 59 and 61 support the ends of leads 20 and 22 respectively and the spacing between the inner and outer guards permits the foam to flow upward toward a selected center segment of each lead. Horizontal extensions 58 and 60 of outer guards 59 and 61 provided a cap to chimneys 24 and 26 to restrict the foam to the selected segment of lead 20 and 22 which lies within these two guards and also support rails 46 and 48 respectively. Inner guards 54 and 56 also provide a vertical extension of chimneys 24 and 26 and restricts foam to the segment of leads 20 and 22 which lies outside these two guards.

Inner guards 54 and 56 each have a horizontal outward extension 62 and 64 respectively for adjustment which will be described later. Vertical downward projections 66 and 68 from inner guards 54 and 56 extend past sponges 70 and 72 which provide a seal for the gap between center partition 28 and these downward projections to prevent foam from rising in the section between the inner guards to come in contact with component 18.

Thus inner guards 54 and 56 and outer guards 59 and 61 prevent foam from being deposited on either tapes 50 and 52 or on other than the selected portions of the leads. When different lead lengths are tinned the locations of the guards and the rail spacing must be adjusted to accomodate the new lead lengths and component size.

In FIG. 2 the adjusting mechanism of the guards relative to container 17 can be seen. Vertical tabs 74 and 76 affixed to the outer end of the horizontal extensions 58 and 60 respectively are drilled and tapped with a right hand thread to receive respective mating threaded rods 78 and 80. Knobs 82 and 84 attached to rods 78 and 80 provide a grip to rotate the respective rods by hand. Vertical extensions 86 and 88 which extend upward from the outer edges of container 17 have holes which are fitted with a bearing to receive and rotatively hold rods 78 and 80 respectively but prevent translation to provide an adjustment anchor. Lips 85 mounted along the top of container 17 provide a guide for horizontal extensions 58 and 60. Similarly, tabs 90 and 92, shown in FIG. 1, are affixed to horizontal extensions 62 and 64 from inner guards 54 and 56 respectively and are drilled and tapped with thread and receive respective mating threaded rods 98 and 100. Aligned holes sized to accomodate rod 98 and 100 extending through the outer walls of chimneys 24 and 26 and the outer walls of container 17, are also aligned with the threaded hole through tabs 90 and 92 respectively. The outer holes through container 17 are fitted with a bearing to rotatively hold rods 98 and 100, but prevent translation to provide an adjustment anchor. Knobs 102 and 104 attached to rods 98 and 100 provide a grip to rotate the respective rods by hand. With this arrangement a rotation of any knob in a clockwise direction will move the attached guard outwardly and a counterclockwise rotation will move one of the four attached guards inwardly. This simple adjustment scheme permits individual adjustment of each of the four guards individually with a minimum of complexity. All four knobs are simply rotated until inner guards 54 and 56 and outer guards 58 and 60 are located in the proper place for the component and component lead length which is being tinned.

In addition to positioning the guards, referring to FIG. 1, when guard 54 is moved inward extension 66 will compress sponge 70 and when moved outward the sponge will expand. Thus the sponge fills the space between extension 66 and partition 28 when guard 54 is adjusted. Sponge 72 interacts in the same way with extension 68 when guard 56 is adjusted. These guard adjusting mechanisms will accomodate the range of components and lead lengths and prevent foam rising in this space.

Figure 3:
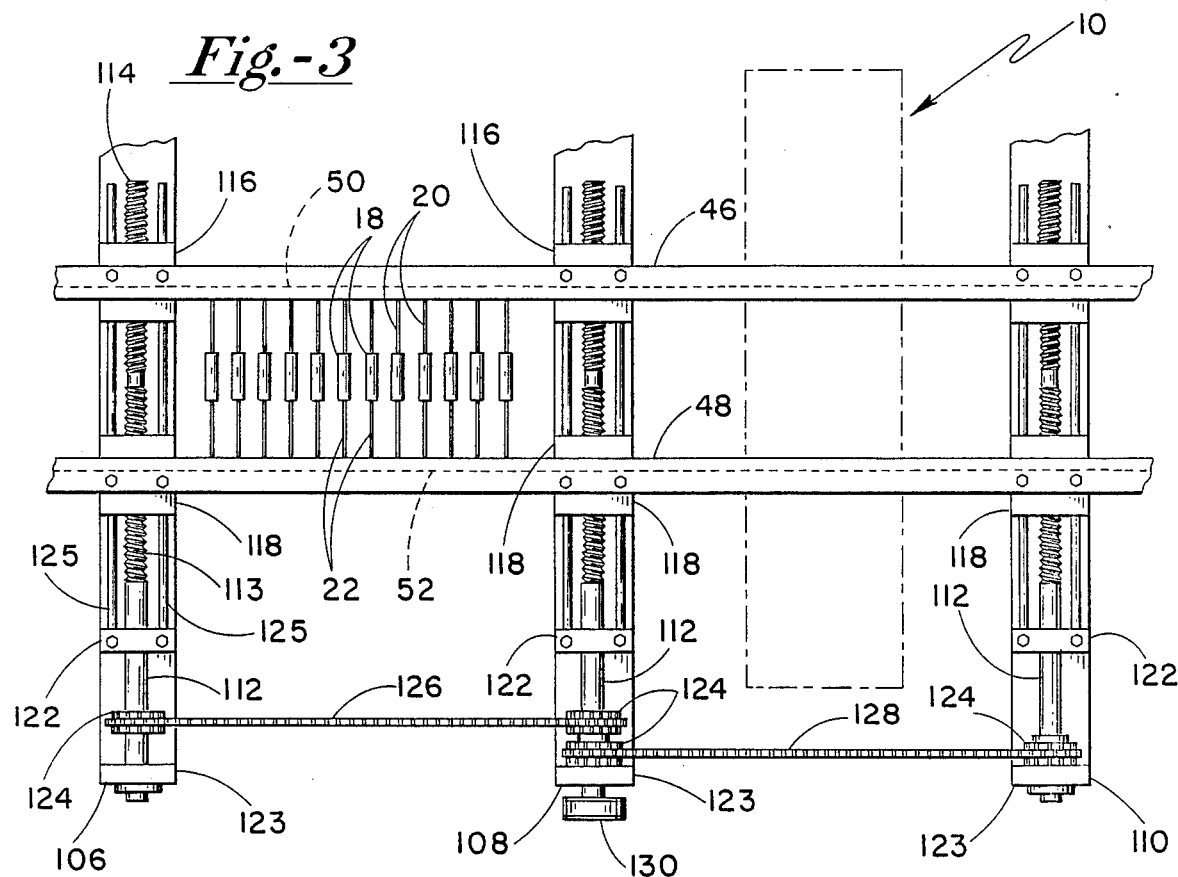
FIG. 3 is a plan view of a portion of the opposed rail adjustment mechanism.
Figure 4:
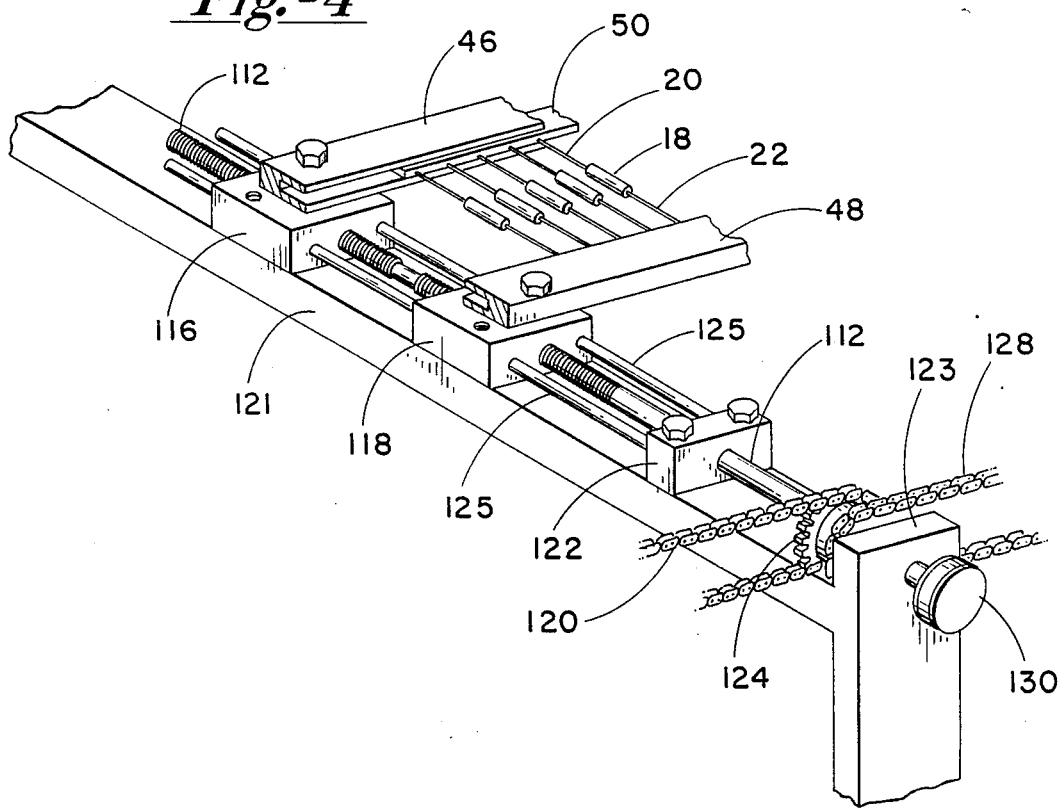
FIG. 4 is a perspective top view of a portion of FIG. 3.

In FIGS. 3 and 4, rails 46 and 48 are shown which support a number of components 18 tied together by tapes 50 and 52 which ride in grooves in rails 46 and 48. Three adjusting stations 106, 108, and 110 provide adjustment for the two sections of rails located between them. Each station has a planar support 121 held by two end supports 123, only one of which is shown here. These stations are identical to each other and use the same identification number for identical parts. A shaft 112 has two sets of threads 113 and 114, having the pitch on one set of threads reversed with respect to the other. Movable blocks 116 attached by bolts to rail 46 and block 118 attached by bolts to rail 48 each have holes with threads cut in a direction which receives shaft 112 and mates with threads 114 and 113 respectively. Movable blocks 116 and 118 are free to slide with respect to a planar support 121 while an additional fixed block 122 and the end support 123 are secured to the horizontal support 120. Two horizontal rods 125 are attached on one end to fixed block 122 and extend through aligned holes in movable blocks 118 and 116, which are sized to permit the movable blocks to slide readily over the rods. Rods 125 keep the movable blocks 116 and 118 aligned with respect to fixed block 122 and positioned against planar support 121. Shaft 115 also extends from the aligned holes in movable blocks 116 and 118 through aligned holes in fixed block 122 and in vertical support 123. The holes in fixed block 122 end support 123 allow shaft 115 to rotate, and the end support has bearings which allow the shaft to rotate but not translate with respect to planar support 121 to provide an adjustment anchor for rails 46 and 48.

Gears 124 are affixed to the end of shaft 112. Chain 126 connects one pair of gears 124 and chain 128 connects a second pair of gears to adjoining adjustment stations gears and shafts. A knob 130 provides means for rotating center shaft 112 by hand. The spacing between parallel rails 46 and 48 is changed by rotating knob 130 by hand. A rotation of knob 130 will rotate attached center shaft 112 directly and the attached center gears 124 while chain 128 will drive the rightmost gear and shaft and chain 126 will drive the leftmost gear and shaft. A rotation of shafts 112 in one direction will cause rails 46 and 48 to move apart while maintaining the same centerline because of the reversal of threads 113 versus threads 114 while a rotation of the shafts in the opposite direction will cause the rails to move together. Since adjusting stations 106, 108, and 110 are identical the amount of movement of rails 46 and 48 due to the rotation of shafts 112 will also be identical at each station which will maintain rails 46 and 48 in a parallel relationship. This arrangement permits a number of adjacent segments of rails 46 and 48 in the apparatus to be adjusted identical amounts about the previous centerline while maintaining parallelism, using a single adjusting knob. This is important because a number of operations in the apparatus use this centerline as a reference point such as the fluxing operation. In operation, when a new set of components 18 with different length component leads 20 and 22 are to be tinned, the spacing between rails 46 and 48 is changed to accomodate the new dimensions by rotating knob 130 to adjust the width of both sections of rails 46 and 48 as required.

Figure 5:
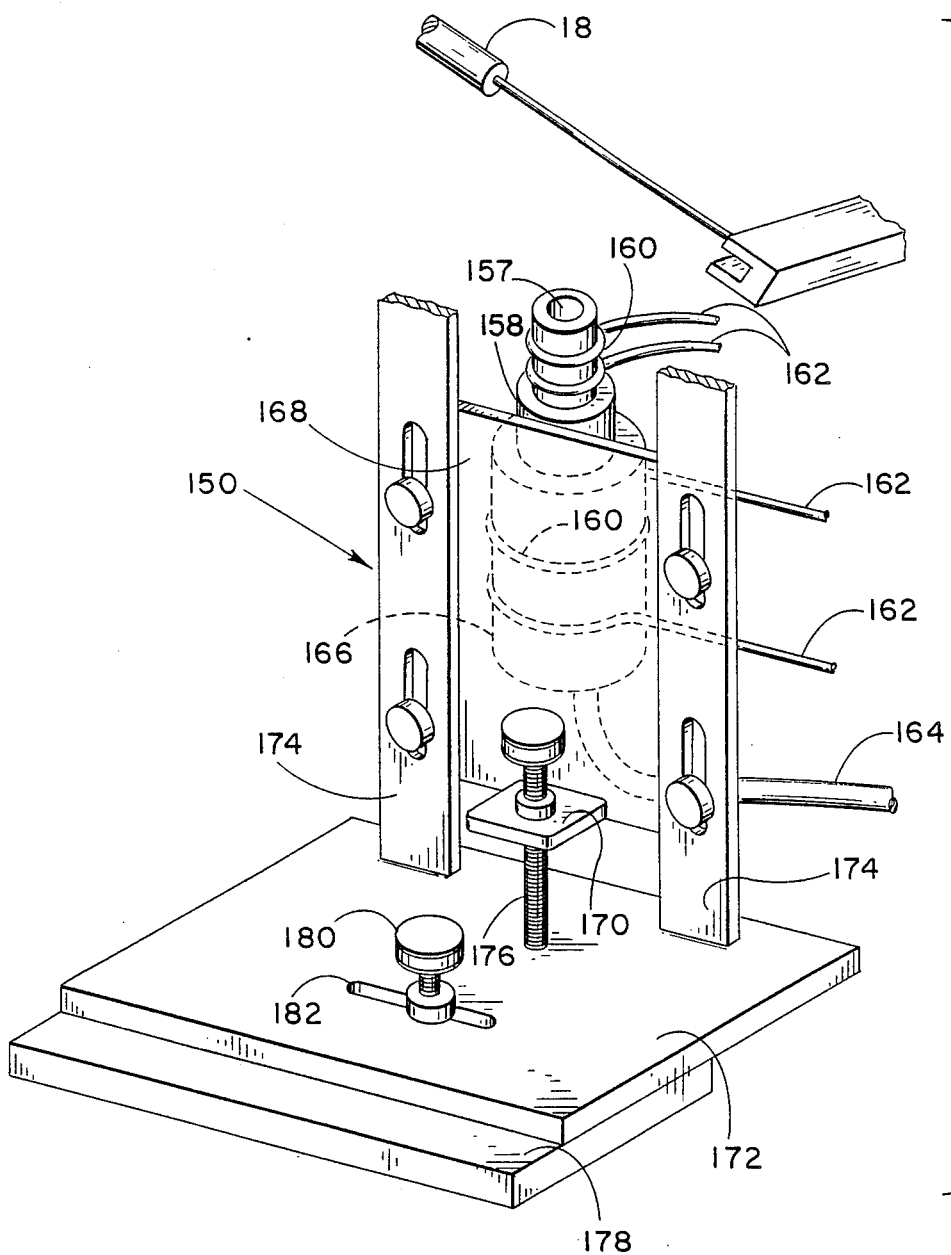
FIG. 5 is a perspective view of vacuum port adjustments.
Figure 6:
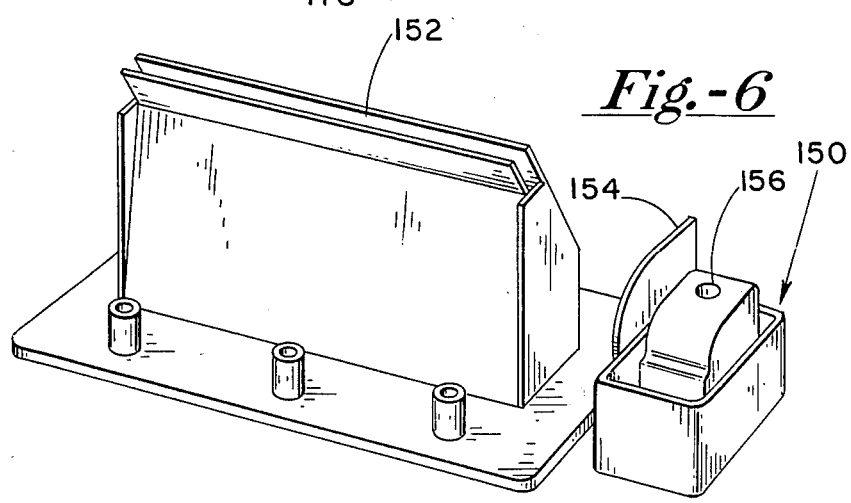
FIG. 6 is a perspective view of a vacuum port shield and solder chimney.

In FIGS. 5 and 6 vacuum equipment 150 used to remove surplus solder from the lower lead immediately after tinning is shown adjacent to solder chimney 150. A shield 154 is interposed between solder chimney 152 and vacuum equipment 150 to insure that solder is not ingested directly from the solder chimney. Vacuum port 156 is the upper end of vacuum line 157 which extends into a metal cylinder 158 used to collect the molten solder. Cylinder 158 and vacuum line 157 are oriented vertically and heated by electrical heating elements 160 which encircle them and are connected to an electrical power source, not shown, through leads 162. Cylinder 158 is connected to a vacuum line 164 which in turn is connected to a vacuum source, not shown. Cylinder 158 is supported within an open container 166 which is attached to a plate 168, which has a horizontal projection 170. Plate 168 is supported on stand 172 by two vertical supports 174. Plate 168 and supports 174 are loosely riveted together through four vertical equal size and spaced slots to permit a vertical adjustment between the plate and supports.

Bolt 176 extends through a matching threaded hole in projection 170 and bears against stand 172 to both support plate 168 and to provide a vertical adjustment means. Stand 172 rests on a base plate 178. Bolt 180 extends through a slot 182 in stand 172 and engages a matching threaded tapped hole in base plate 178. With bolt 180 loosened stand 172, which supports vacuum equipment 150, can be moved horizontally along this slot to adjust the location of vacuum port 156. When stand 172 is at the desired horizontal location, bolt 180 is tightened to lock the stand in position. Those two adjustments permit locating port 156 relative to the component leads and the tapes such that the solder icicles are removed without displacing the tapes. Heating element 160 is rated to insure that the solder is always maintained in a liquid state within cylinder 158 and port 156.

These improvements permit utilizing this apparatus for any length component and eliminates the problems encountered in operating the apparatus as taught by Benson et al.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. In apparatus for automatically tinning component leads having solder wave means and foam flux means with means for carrying components over the flux and solder wave means for fluxing and tinning opposed component leads, the improvement comprising: the flux means being separate foam flux generating means; each having separate flow rate adjustment means, provided for each lead of a component, the means for carrying components being arranged such that as the components are carried over a foam flux means opposed component leads will be simultaneously immersed in foam flux from the separate foam generating means; with the foam flux height relative to each lead established independently by the separate rate adjustment means.

2. Apparatus as in claim 1 and further comprising adjustable foam flux restricting means, having the foam flux restricted to a selectable segment of each respective component lead.

3. Apparatus as in claim 1 wherein each foam flux generating means comprises a porous stone immersed in a foam flux liquid held by a container and connected to a source of compressed air, and wherein the foam flux rate adjusting means comprises a manually adjustable valve inserted in the connection between each stone and the source of compressed air.

4. Apparatus as in claim 3 wherein the adjustable foam flux restricting means for each lead comprises a vertically oriented flux chimney enclosing the stone with horizontal top edges, and having a pair of parallel, opposed, vertical guards with horizontal top edges, extending across and slideably supported by the top edges of the flux chimney; and having restriction means for the foam flux generated within the flux chimney arranged such that flux can only flow between the pair of guards; and having adjusting means for the position of each individual guard, arranged such that each guard can be positioned relative to the chimney along a line perpendicular to the parallel guards; and having the chimney, guards, and components dimensioned, located and arranged such that each component lead is perpendicular to, rests upon and extends across, one of the parallel pairs of guards.

5. Apparatus as in claim 4 wherein the adjusting means for each outer guard, furtherest from the component, comprises a horizontal extension from each outer guard extending outwardly from the components and parallel to the adjacent component leads to a location adjacent the outside edge of the chimney opposite the component, and terminating in a tab parallel to the outer guard; and having a vertical extension extending from the outside edge of the container adjacent, parallel to, and aligned with the tab; with the vertical extension having a first hole containing bearing means, and the tab having a matching threaded second hole which is aligned with the first hole; and having a threaded rod sized to and engaging the threads in the second hole, and extending to and through the first hole, and with the outer end of the rod having a knob mounted thereon for manual adjustment; and having the bearing means of the first hole arranged such as to permit the rod to rotate but not translate with respect to the vertical extension.

6. Apparatus as in claim 4 wherein the adjusting means for each inner guard, nearest the component, comprises a horizontal extension from each inner guard extending outwardly from and parallel to the adjacent component leads, to a location opposite the component, within and adjacent the edge of the chimney, and terminating in a tab parallel to the inner guard; with the tab having a threaded first hole, and with the outer chimney wall adjacent the tab having a matching aligned second hole, and with the outer container wall adjacent the second hole having a third hole containing bearing means being matched and aligned with the second hole; having a threaded rod sized to, and engaging the threads in the first hole and extending through the second and third hole, and with the outer end of the rod having a knob mounted thereon for manual adjustment; and having the bearing means of the third hole arranged such as to permit the rod to rotate but not translate with respect to the outer container.

7. Apparatus as in claim 4 wherein the restriction means comprises a vertical downward projection from, and in the plane of the inner guard, with the adjacent chimney wall being planar and parallel thereto; and having a sponge-like spacer interposed between the downward projection and the adjacent chimney wall, being dimensioned and arranged such that foam cannot flow upward therebetween even when the inner guard is repositioned by the guard adjusting means; and having a horizontal planar extension outward from the outer guard, covering the chimney top, extending to a location beyond the chimney, such that foam cannot flow upward from the chimney beyond the outer guide; and with the chimney having guide lips attached along the top outer edges, with the lips being directed inward; and with the guide lips and horizontal planar extension sized, oriented and arranged, such that the guide lips slidably engage and provide a guide path for the horizontal planar extension across the chimney parallel to the components.

* * * * *